(12) United States Patent
Chen et al.

(10) Patent No.: US 8,819,719 B1
(45) Date of Patent: Aug. 26, 2014

(54) REAL-TIME VIDEO COMMENTING

(75) Inventors: Steven Chen, San Francisco, CA (US);
Michael Powers, San Francisco, CA (US); Hong Qu, San Mateo, CA (US);
Yu Pan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 950 days.

(21) Appl. No.: 11/952,125

(22) Filed: Dec. 6, 2007

Related U.S. Application Data

(60) Provisional application No. 60/868,925, filed on Dec. 6, 2006.

(51) Int. Cl.
*H04N 7/173* (2011.01)

(52) U.S. Cl.
USPC ............. 725/24; 725/109; 725/110; 715/716; 715/719; 715/736; 715/738

(58) Field of Classification Search
USPC ............. 725/24, 32, 109, 110, 131–139, 151; 709/703, 719; 715/721
See application file for complete search history.

(56) References Cited

U.S. PATENT DOCUMENTS

| | | | | |
|---|---|---|---|---|
| 2002/0104099 | A1* | 8/2002 | Novak | 725/136 |
| 2006/0190966 | A1* | 8/2006 | McKissick et al. | 725/61 |
| 2007/0143493 | A1* | 6/2007 | Mullig et al. | 709/232 |
| 2007/0203911 | A1* | 8/2007 | Chiu | 707/10 |
| 2007/0250791 | A1* | 10/2007 | Halliday et al. | 715/808 |
| 2007/0261071 | A1* | 11/2007 | Lunt et al. | 725/13 |
| 2008/0052630 | A1* | 2/2008 | Rosenbaum et al. | 715/738 |
| 2008/0263585 | A1* | 10/2008 | Gell et al. | 725/32 |

OTHER PUBLICATIONS

Masahiro Tabuchi; TV Community System That Enables Users to Build and Maintain a Community Associated With the Time_Line of TV Program; May 2004. NEC C&C Media Research Lab. vol. 99, No. 7, ISSN 0919-6072.*

YouTube, Inc., "Most Subscribed Channels (All Time)," Archived on Web.archive.org on Sep. 3, 2006, 1 Page [online] [retrieved on May 7, 2013] Retrieved from the internet <URL:http://web.archive.org/web/20060903035149/http://www.youtube.com/members?s=ms&t=a&g=0>.

Kirkpatrick, M., "*Grouper lets video viewers leave video comments*," TechCrunch, Jul. 28, 2006, [online] [Retrieved on Sep. 3, 2009], 8 pages, Retrieved from the internet URL:<http://www.techcrunch.com/2006/07/28/grouper-lets-video-viewers-leave-video-comments/>.

* cited by examiner

*Primary Examiner* — Brian T Pendleton
*Assistant Examiner* — Alan Luong
(74) *Attorney, Agent, or Firm* — Fenwick & West LLP

(57) ABSTRACT

The present invention enables real-time video commenting by viewers of media content on a web site. The media content may be video, audio, text, still images or other types of media content. When a content viewer indicates a desire to provide a real-time video comment, a content server causes a video input device at the content viewer's location to be activated. The content viewer's video comment is captured by the video input device and transmitted to the content server, where it is stored and associated with the video being commented upon. When the original video is subsequently presented to content viewers, indicia of the video comment such as a thumbnail or description of the comment is also presented, thus inviting content viewers to view the video comment in addition to the original video.

14 Claims, 12 Drawing Sheets

FIG. 8

REAL-TIME VIDEO COMMENTING

CROSS-REFERENCE TO RELATED APPLICATIONS

This application claims the benefit of U.S. Provisional Application No. 60/868,925, filed on Dec. 6, 2006, and incorporated by reference herein in its entirety.

BACKGROUND

1. Field of the Invention

The present invention relates generally to providing video on the Internet. In particular, embodiments of the present invention are directed toward allowing a viewer of video or other content to respond to the video by using the viewer's webcam to produce a video comment.

2. Description of Background Art

Various Internet websites provide a method for users to comment on the contents of the website. For example, news publications, blogging sites, video and audio content providers typically provide a "comment" option. A visitor to the site (who may be a registered user of the site or not, depending on the particular requirements of the site) who wishes to comment on a story or other posted content can generally select a "comment" or "feedback" link, and post textual comments for others to view.

Some sites allow viewers to upload pre-recorded comments in video format. Typically, a user who wishes to leave a video comment must first prepare the comment video file and then upload the recorded video file to the server. This manual process can be difficult and time- and labor-intensive, requiring particular knowledge of how to operate a video device and transfer a video file to a server for posting.

SUMMARY

Embodiments of the present invention enable real-time video commenting by viewers of media content on a web site. The media content may be video, audio, text, still images or other types of media content. When a content viewer indicates a desire to provide a real-time video comment, a content server causes a video input device at the content viewer's location to be activated. The content viewer's video comment is captured by the video input device and transmitted to the content server, where it is stored and associated with the video being commented upon. When the original video is subsequently presented to content viewers, indicia of the video comment such as a thumbnail or description of the video comment is also presented, thus inviting content viewers to view the video comment in addition to the original video.

BRIEF DESCRIPTION OF THE DRAWINGS

FIG. 8 illustrates a user interface screen for selecting video response preferences in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
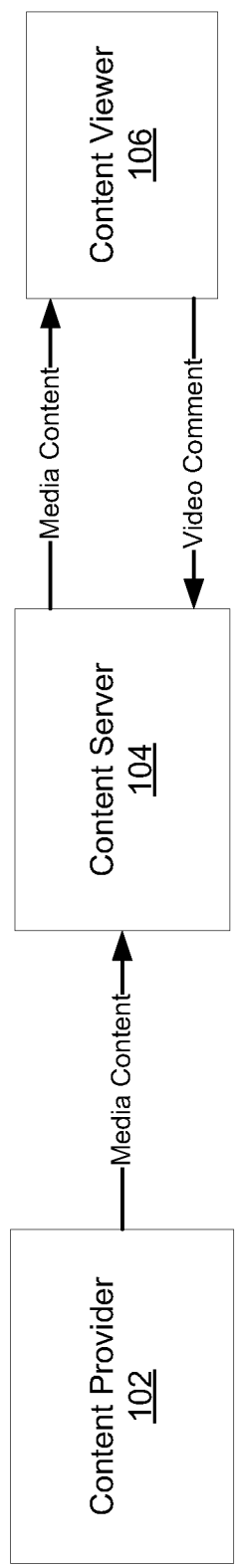
FIG. 1 is a block diagram of the overall architecture of an embodiment of the present invention.

FIG. 1 provides an overview of an embodiment of the present invention. A content provider 102 provides media content to a content server 104. Examples of media content include audio, video, image and text content; other forms of content available for consumption may also be provided. The media content may have been created by content provider 102, but need not have been. For clarity, we assume below that media content is video content, but no exclusion of other types of media content should be inferred.

Content server 104 receives uploaded media content from content providers and allows content to be viewed by content viewers 106. Content may be uploaded to server 104 via the Internet from a personal computer, through a cellular network from a telephone or PDA, or by other means for transferring data over a network known to those of skill in the art. Content may be downloaded from server 104 in a similar manner; in one embodiment media content is provided as a file download to a content viewer 106; in an alternative embodiment, media content is streamed to the content viewer. The means by which media content is received by content server 104 need not match the means by which it is delivered to a content viewer 106. For example, content provider 102 may upload a video via a browser on a personal computer, whereas content viewer 106 may view that video as a stream sent to a PDA. Note also that content server 104 may itself serve as the content provider 102.

Content viewers 106 view media content on content server 104 via a user interface. Typically, viewer 106 runs a web browser such as Microsoft Internet Explorer or Mozilla Firefox, and content server 104 includes a web server such as Microsoft Internet Information Services. Using her browser, a viewer 106 browses for content provided by content server 104 and views content of interest, including video content. As described further below, viewer 106 also provides real-time video comments to content server 104 in response to viewed content.

Figure 2:
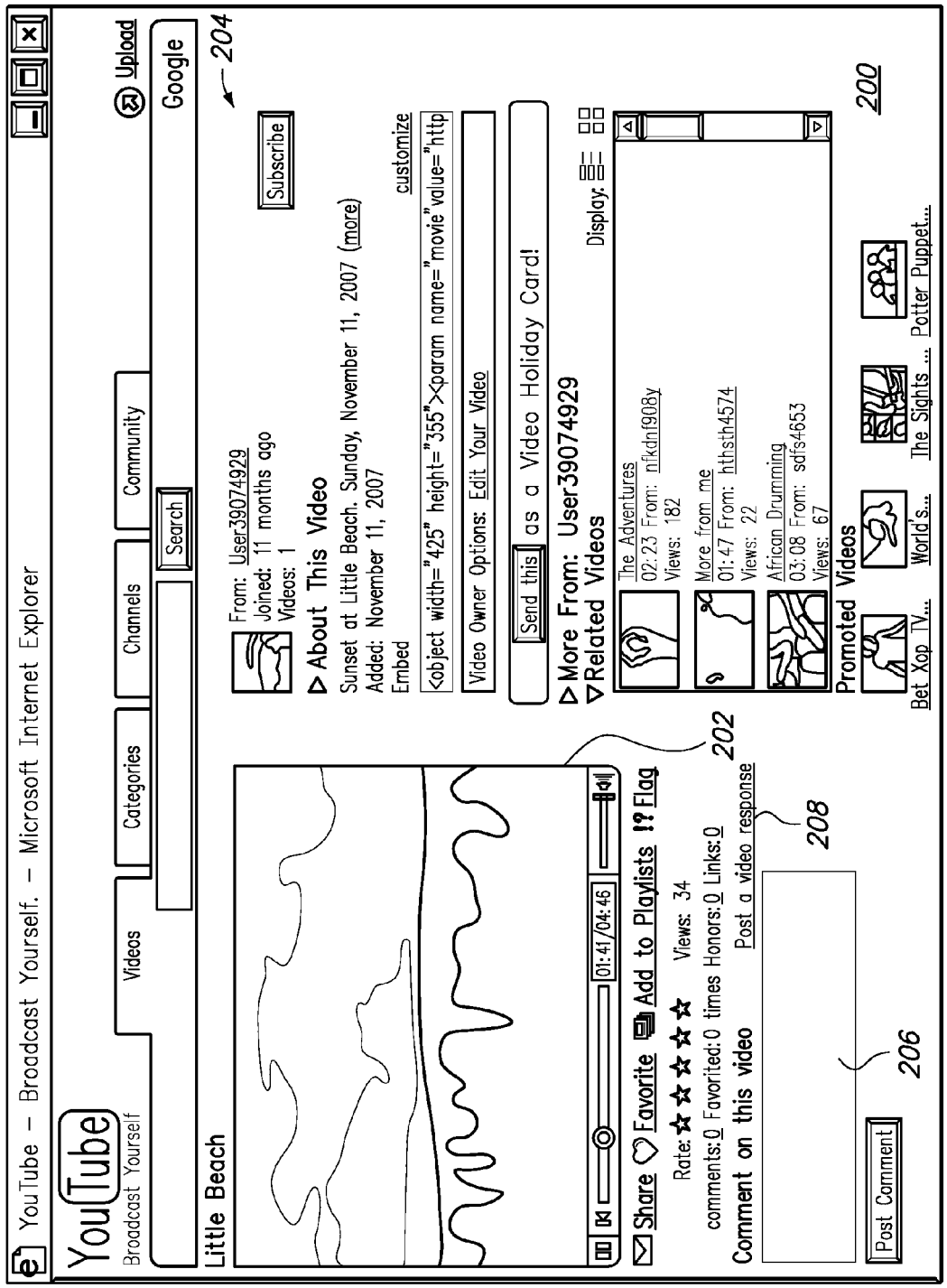
FIG. 2 is a screen shot illustrating an example user interface for viewing media content in accordance with an embodiment of the present invention.

FIG. 2 is a screen shot illustrating an example of a web page 200 providing a user interface for viewing media content from content server 104 by content viewer 106. The UI includes a video 202, as well as information 204 about the video, such as the name or user ID of the content provider 102, the date the video was uploaded, etc. In the illustrated embodiment, a text box 206 allows a viewer 106 to enter a textual comment about the video 202.

Figure 3:
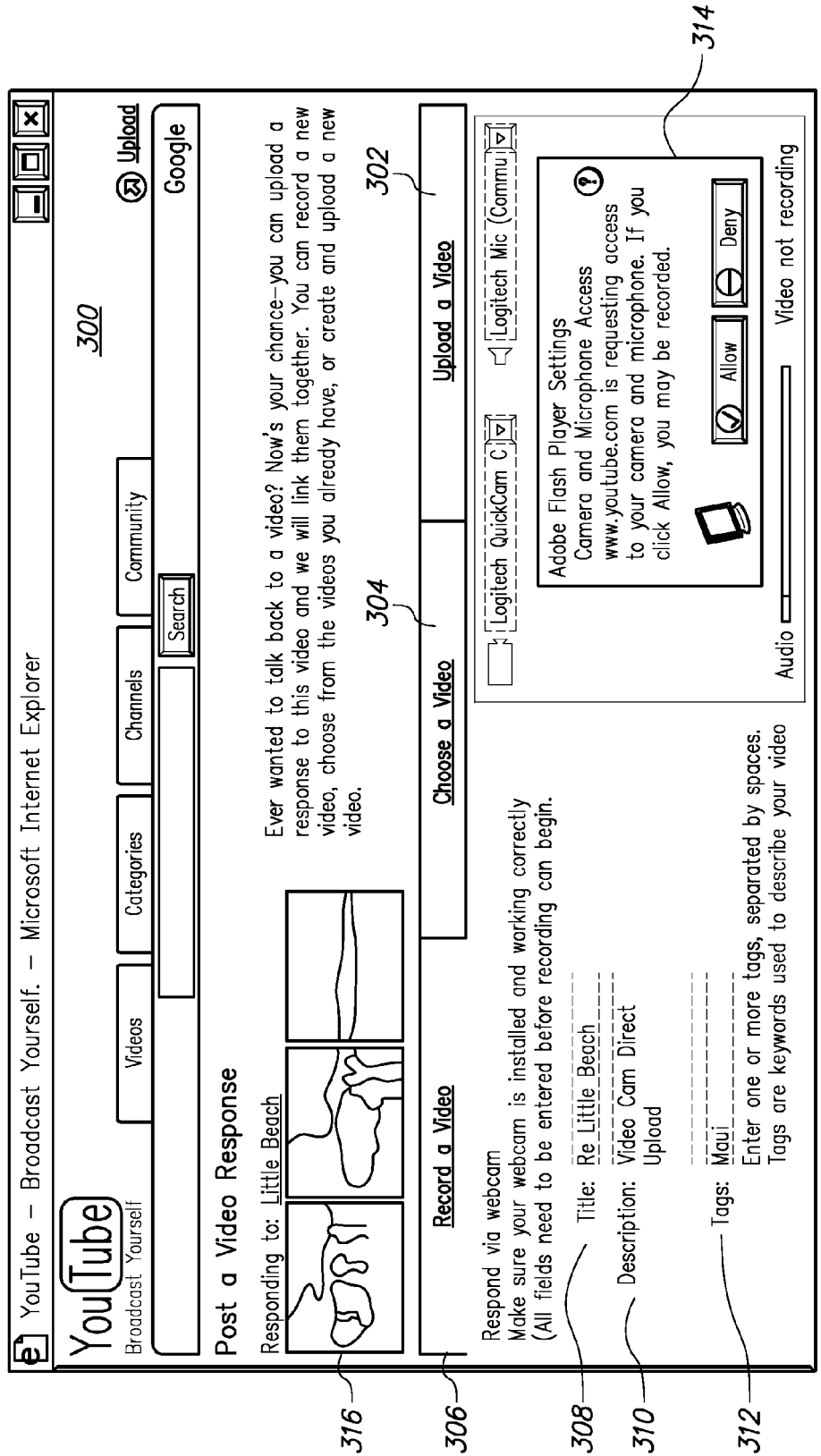
FIG. 3 is a screen shot illustrating a user interface for posting a video response in accordance with an embodiment of the present invention.

Web page 200 also includes a link 208 labeled "Post a video response." By selecting this link, and referring now to FIG. 3, content viewer 106 indicates a desire to post a video response, and is provided with a web page 300 containing an interface for providing video responses.

Figure 7:
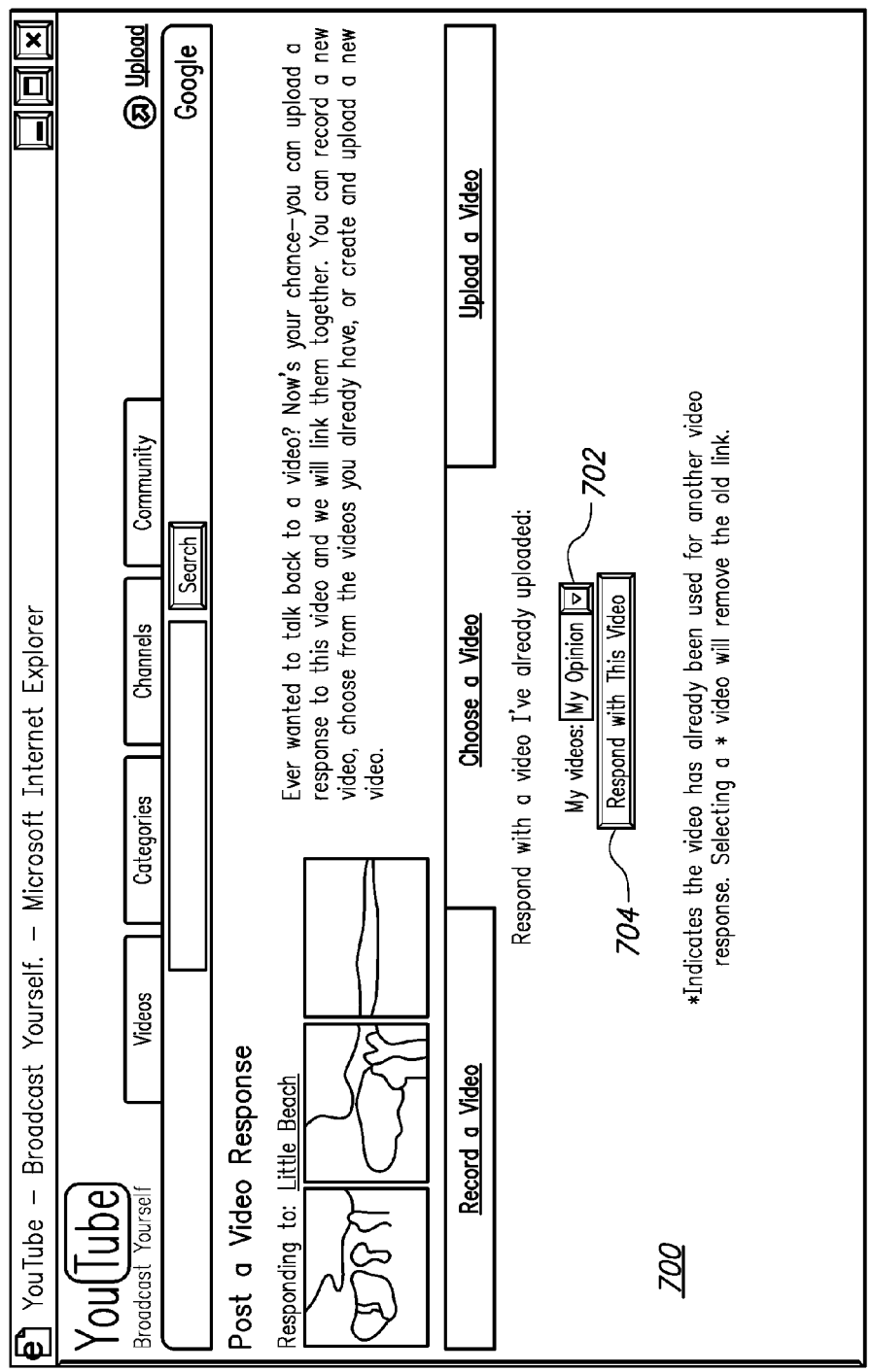
FIG. 7 illustrates a user interface screen for providing a video comment in accordance with an embodiment of the present invention.

Web page 300 provides three options to content viewer 106 via selectable tabs. The content viewer 106 can select the "Choose a video" tab 304, which allows the content viewer 106 to select a video already stored on content server 104 to be provided as a reply. If so, referring to FIG. 7, she is presented with a user interface screen 700 that provides a drop-down list 702 of the content viewer's available videos, from which she may select one and then click button 704 to respond with the selected video. Alternatively, she may select the "Upload a video" tab 302 to indicate that she wishes to upload a pre-recorded video file. Finally, the content viewer 106 may select the "Record a video" tab 306 to indicate that she wishes to provide a real-time video comment. In one embodiment, the "Record a video" tab is selected by default, though in alternative embodiments other tabs may be selected by default. In other embodiments, fewer tabs may be shown, or no tabs may be shown, with only the real-time comments option available.

In the illustrated embodiment, the "Record a Video" tab 306 allows content viewer 106 to provide a title 308 for the comment, as well as a description 310, and tags 312 to be associated with the comment. A video window 314 is also shown. In the illustrated embodiment of FIG. 3, video window 314 is not showing video, but is instead displaying a warning message to viewer 106 indicating that the content server 104 is attempting to access a video input device on the viewer's computer. In one embodiment, activation and control of the viewer's video input device by content server 104 is effected using the Flash Media Server by Adobe Systems Incorporated of San Jose, Calif. Web page 300 in the illustrated embodiment additionally provides thumbnail images 316 from the video being commented upon.

Figure 4:
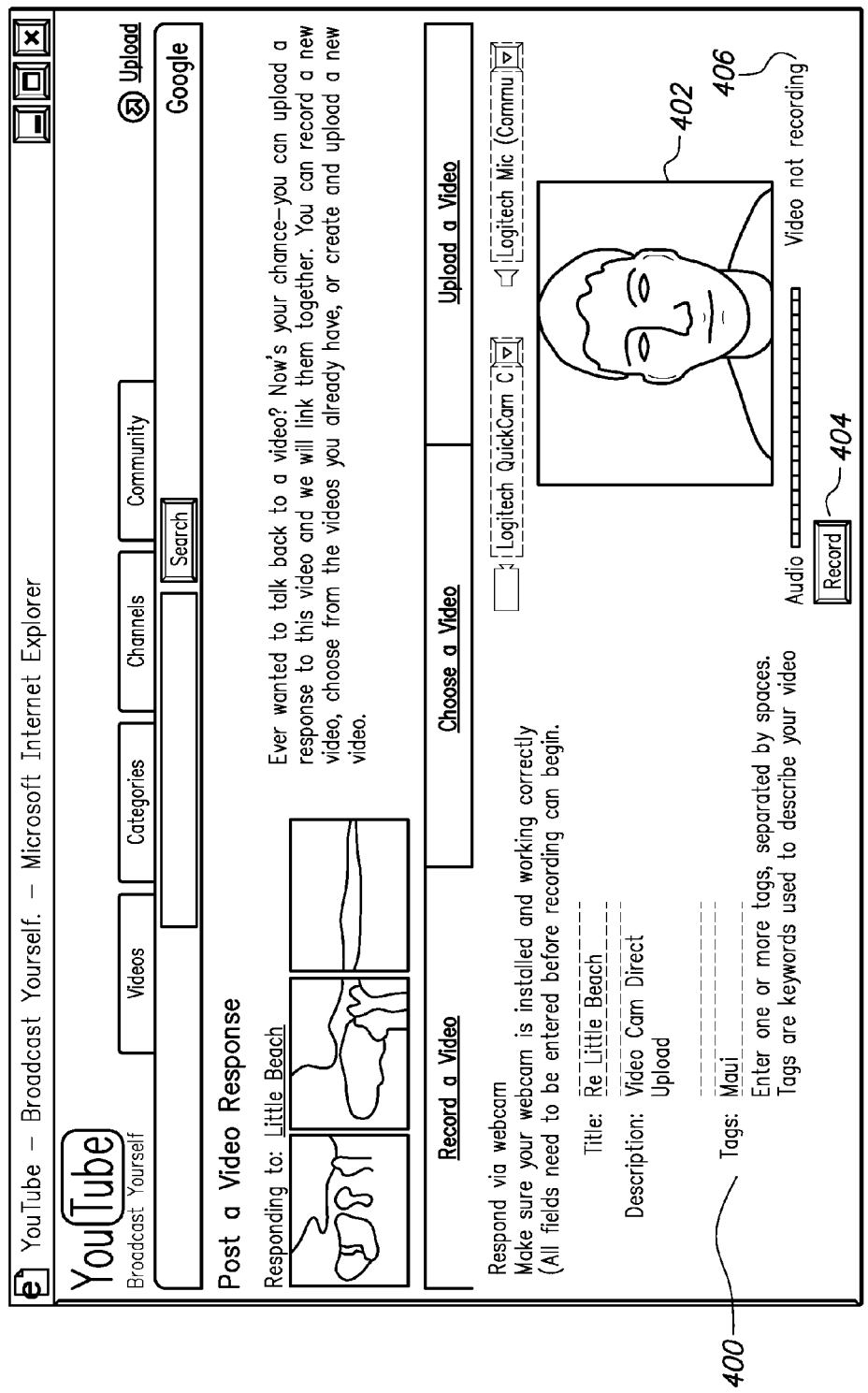
FIG. 4 is a screen shot of a user interface for receiving real-time video commenting in accordance with an embodiment of the present invention.

Once the content viewer has entered information about her comment and, if necessary, dismissed the warning message, a video input device such as a camera attached to the content viewer's computer is activated. In another embodiment, the content viewer 106 is instructed to manually activate her video input device. FIG. 4 illustrates a web page 400 presenting a user interface for receiving real-time video comments. In FIG. 4 video window 402 displays the video image being captured by the video input device. Also illustrated in FIG. 4 is a "Record" button 404 that content viewer 106 can click to begin recording the images received by the video input device. A status indicator 406 also indicates to the viewer whether the video is currently being recorded. After the viewer clicks "Record", the button 404 is replaced by another (not shown) that the viewer can click to indicate that she has finished recording.

As the viewer speaks and moves, the sound and images are captured by the video input device and transmitted to content server 104. In one embodiment, the video image is streamed to content server 104. In an alternative embodiment, the video is cached locally and then transmitted to content server 104 once the comment is complete. Content server 104 stores the received video and associates it with the original video being commented on. Content server 104 may also perform other housekeeping functions, e.g., updating the viewer's or the content provider's account, transcoding video content, and the like, as appropriate to the particular implementation of the content server 104. Content server 104 can also perform steps to make the video comment searchable by, for example, its title, keywords, and so on. In one embodiment, video comments can be searched separately from posted videos. In one embodiment, video comments can be searched along with posted videos. In either situation, information about the video comment is added to an index on server 104.

Figure 5:
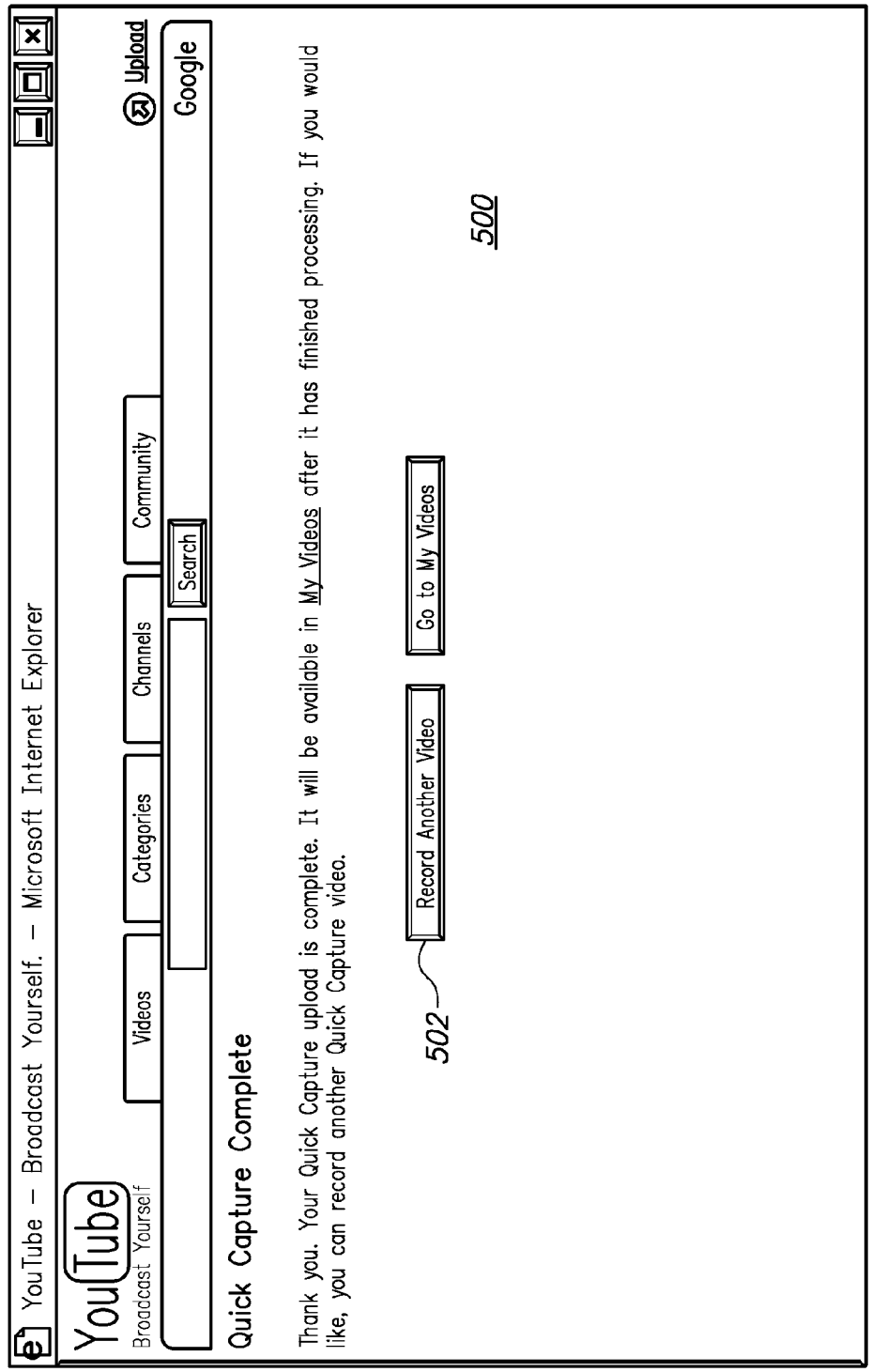
FIG. 5 is a screen shot of a confirmation page indicating that a real-time video comment has been received in accordance with an embodiment of the present invention.

FIG. 5 illustrates a confirmation page 500 that is displayed to content viewer 106 to indicate that the real-time video comment has been successfully received by content server 104. In one embodiment, confirmation page 500 additionally offers the content viewer 106 the opportunity to record another video by selecting an appropriate button 502 on the page.

Figure 6:
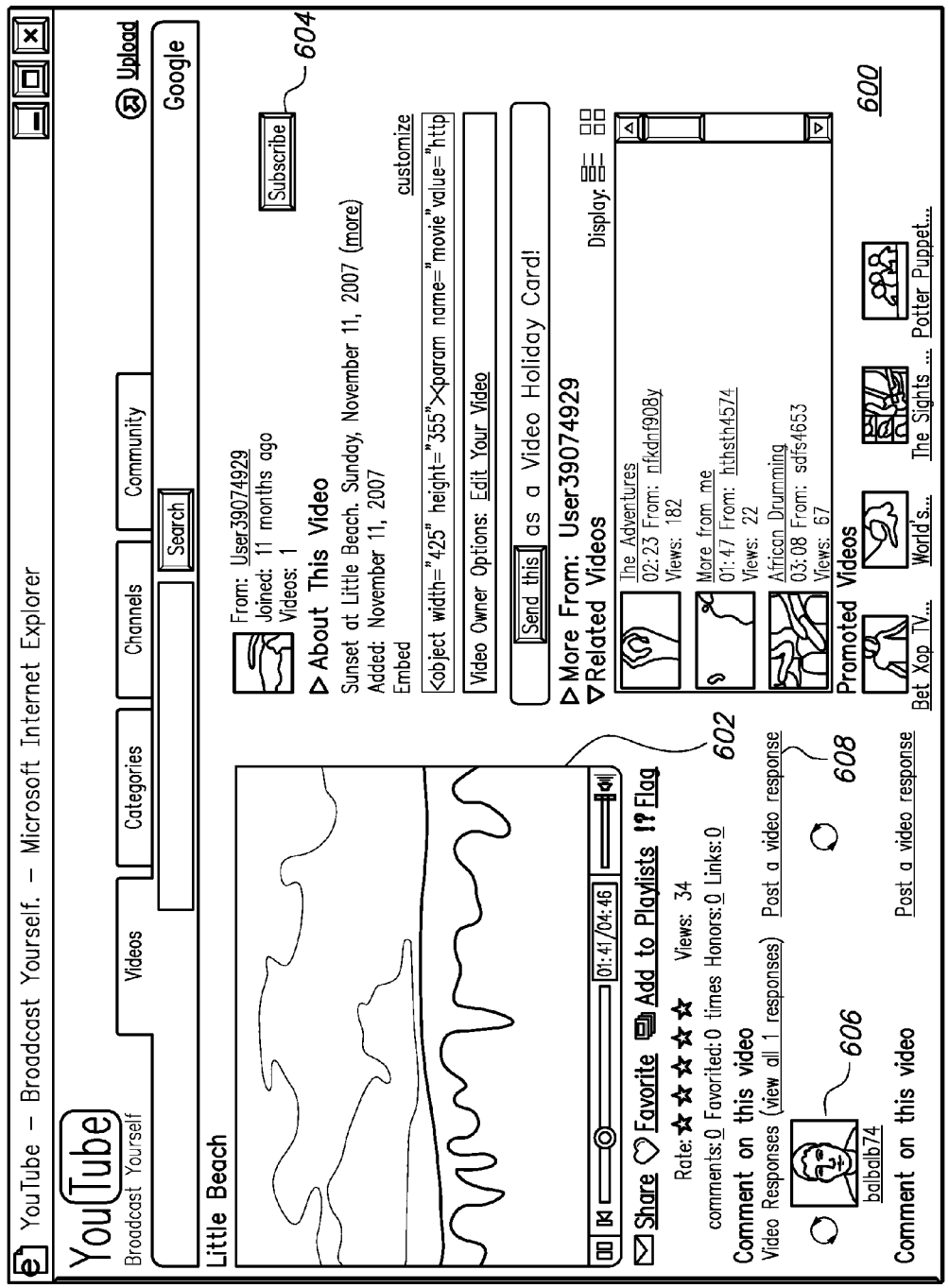
FIG. 6 is a screen shot illustrating a user interface page displaying an indication of a received real-time video comment in accordance with an embodiment of the present invention.

Once a real-time video comment has been received, content server 104 updates the presentation of the original video to include an indication of the comment. FIG. 6 provides an example of a web page 600 that displays a video that has been commented upon with a real-time video comment. Web page 600 displays the original video 602 and information about the video 604. In addition, however, web 600 includes an indication 606 that a video response has been posted for this video 602. In the illustrated embodiment, the indication 606 is a thumbnail taken from the video comment itself along with the user ID of the viewer 106 who commented on the video. In one embodiment, web page 600 is viewable to all users. FIG. 6 also includes a link 608 to post additional video comments in the manner described above.

Figure 8:
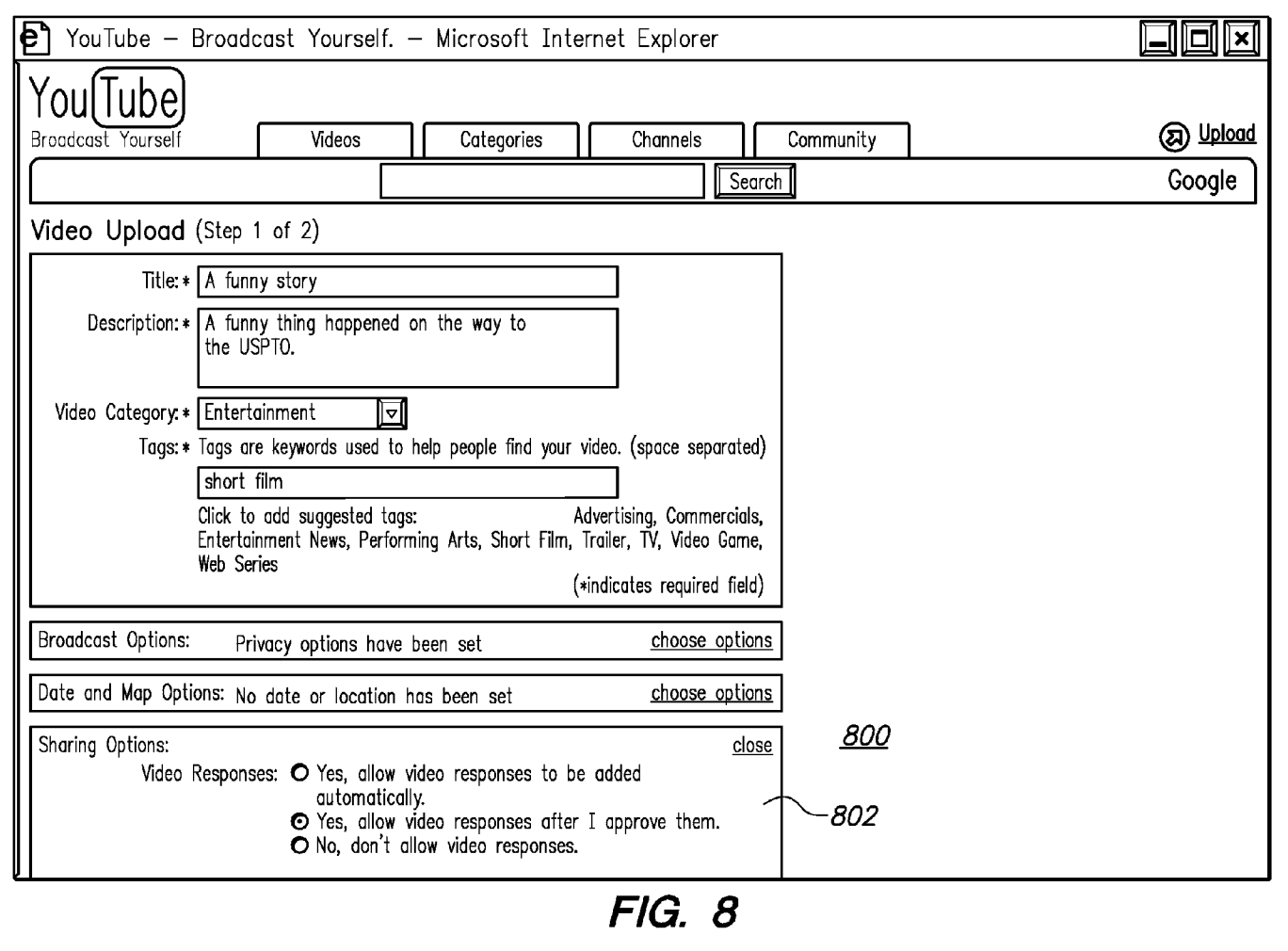

In one embodiment, content provider 102 and/or content server 104 can specify that video comments must be approved before they are displayed to the public. FIG. 8 illustrates a user interface 800 for uploading a video by a content provider 102. In addition to information about the video being uploaded, a preference setting 802 allows content provider 102 to specify whether video responses should be added automatically, added only after approval by content provider 102, or entirely disallowed.

Figure 9:
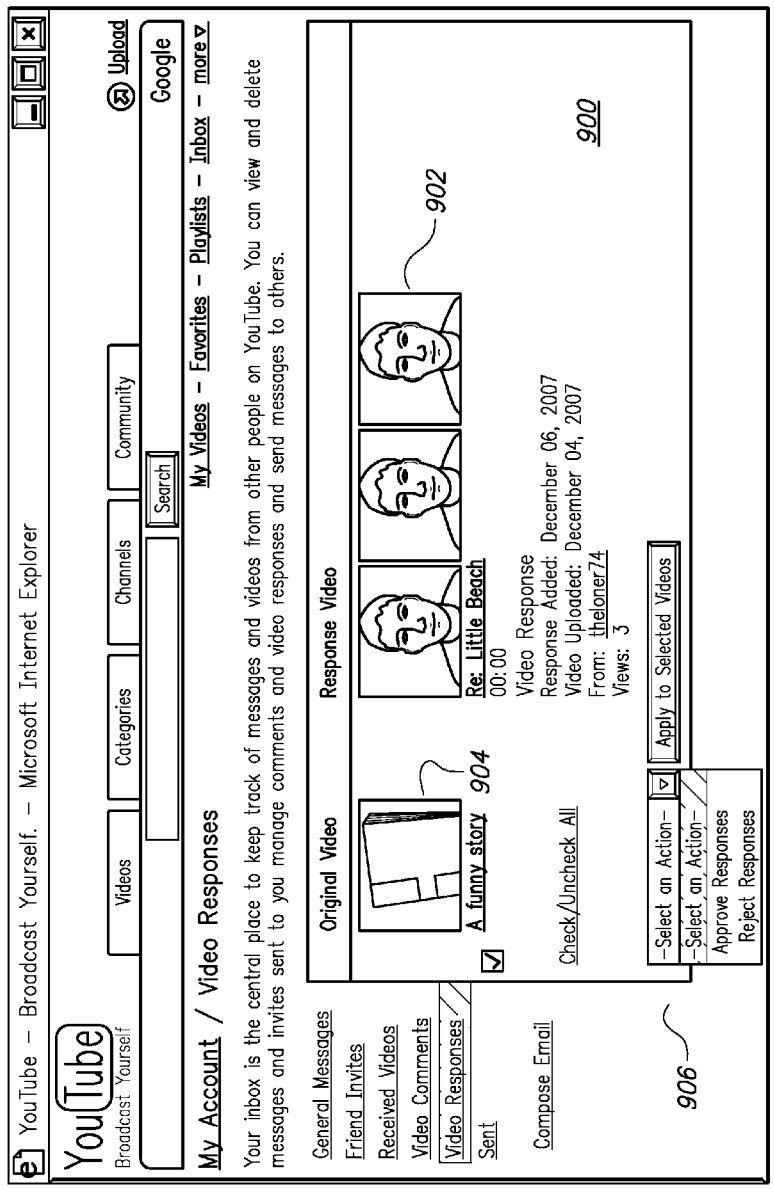
FIG. 9 is a screen shot illustrating a user interface for approving or rejecting video comments in accordance with an embodiment of the present invention.

FIG. 9 illustrates a user interface 900 through which content provider 102 can approve submitted video responses. An indication 902 of the original video being responded to is provided, along with a thumbnail and link 904 to the submitted video comment. The content provider 102 can review the video comment as desired, and indicate through drop-down box 906 whether to approve or reject the response.

In one embodiment, an additional review process is available, by either human beings or automatic software on server 104, allowing review of the video comment for appropriateness before the video is posted.

Figure 10:
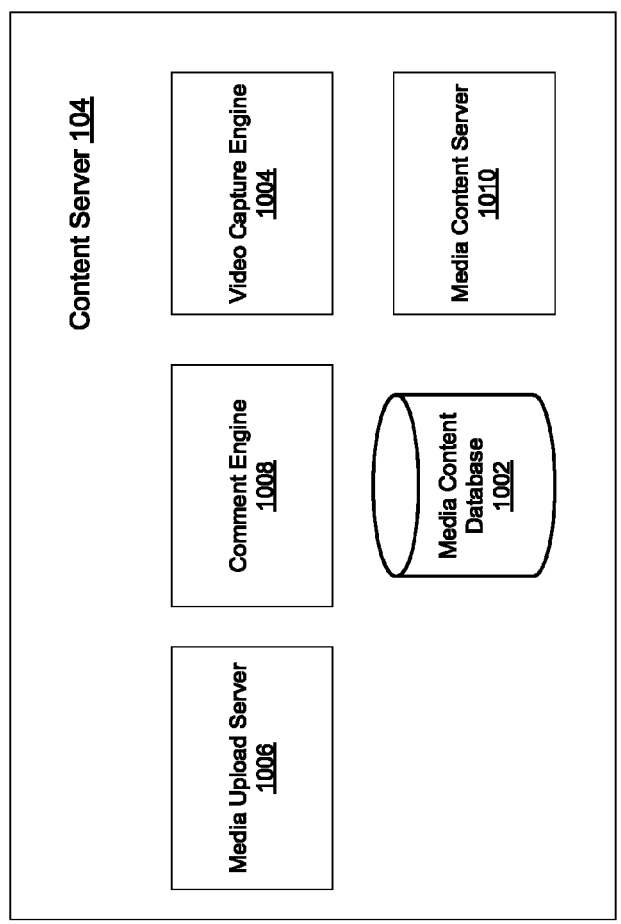
FIG. 10 is a block diagram of a content server in accordance with an embodiment of the present invention.

FIG. 10 provides a more detailed illustration of content server 104 in accordance with an embodiment of the present invention. Content server 104 includes a media content database 1002, video capture engine 1004, media upload server 1006, comment engine 1008 and media content server 1010. The illustrated components work together to perform the functions of content server 104 described above.

Figure 11:
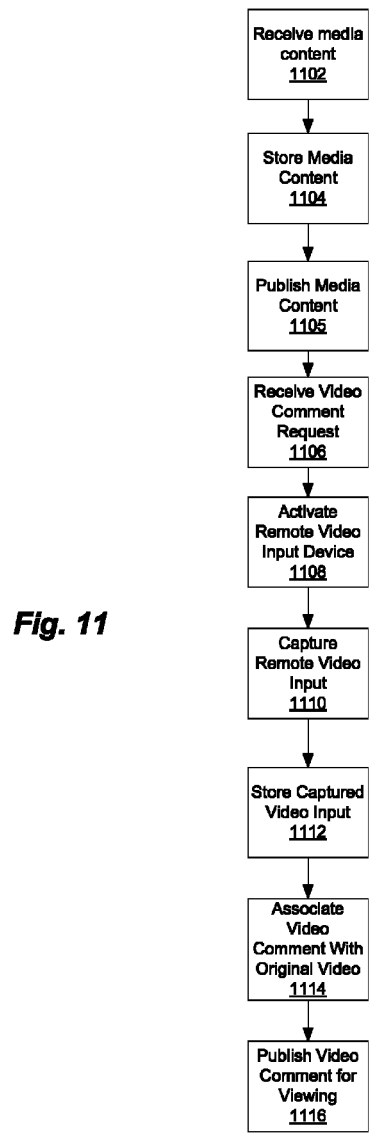
FIG. 11 illustrates a method for receiving real-time video comments in accordance with an embodiment of the present invention.

FIG. 11 is a flowchart that illustrates a method for providing real-time video comments in accordance with an embodiment of the present invention. Initially, media upload server 1006 receives 1102 media content from content provider 102.

Media upload server 1006 then stores 1104 the received media content in media content database 1002. In one embodiment, upload server 1006 performs various processing functions such as transcoding, fingerprinting, etc., prior to storing the content in database 1002. Media content server 1010 then publishes 1105 the received media content so that it can be consumed by content viewers 106. Next, comment engine 1008 receives 1106 a request from content viewer 106 to provide a real-time video comment. Video capture engine 1004 activates 1108 the remote video input device located at the content viewer's site and begins capturing 1110 the remote video input. Video capture engine 1004 then stores 1112 the received video comment in media content database 1002, associating 1114 it with the original video, and performing any desired processing. Media content server 1010 publishes 1116 the received video comment along with the original video, such that content viewers 106 can view the video comment along with the original video.

Figure 12:
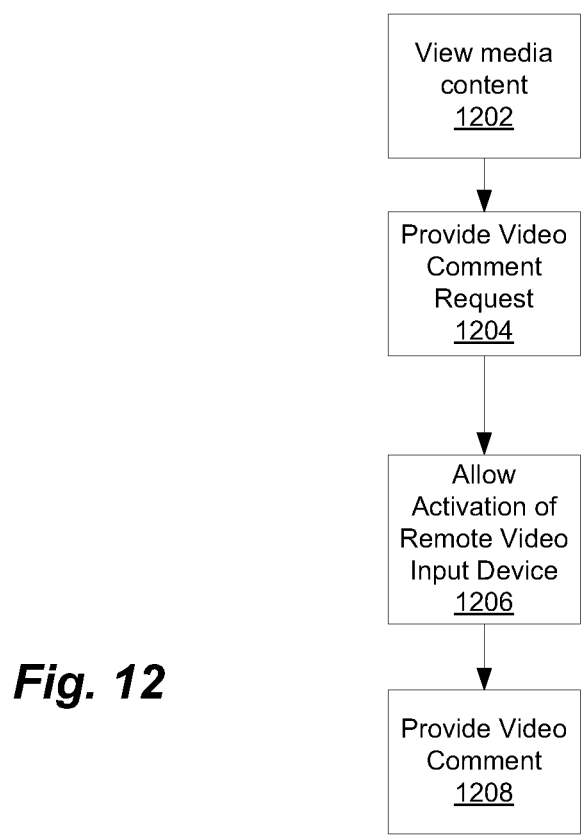
FIG. 12 illustrates a method for providing real-time video comments in accordance with an embodiment of the present invention.

FIG. 12 is a flow chart that illustrates from a content viewer's perspective a method for providing real-time video comments in accordance with an embodiment of the present invention. A content viewer 106 views 1202 media content from content server 104. Deciding to leave a video comment, the content viewer then provides 1204 a video comment request to content server 104. In one embodiment, content server 104 then attempts to activate a video input device such as a camera at the content viewer's location, such as on the content viewer's PC. In one embodiment, as a security feature the content viewer 106 must allow 1206 the activation of her video input device to take place, although in alternative embodiments not such permission is required. In still other embodiments, the content viewer activates her input device manually, e.g., when instructed to do so by content server 104. Once the input device is activated, the content viewer 106 provides 1208 her video comment, which is transmitted to content server 104 for processing and posting as described above.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the content server 104 may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method of associating video responses with video content, the method comprising;
   displaying a web page including first video content to a content viewer device over a network, the first video content provided by a content provider;

responsive to a preference setting associated with the first video content indicating that video responses may be added, displaying on the web page a link for providing video responses;

receiving via activation of the link a request from the viewer to provide a video response to the displayed first video content;

activating a video input device associated with the content viewer device;

receiving the video response from the viewer via the video input device;

associating the received video response with the displayed first video content, wherein the video response is searchable separately from the first video content commented by the video response, and display of the first video content is updated to include an indicia of the received video response and one or more textual comments on the first video content provided by a plurality of other viewers; and responsive to receiving from the content provider approval of the received video response, displaying the indicia of the received video response on the web page.

2. The method of claim 1, wherein the video content is stored on a video hosting site accessible via the Internet.

3. The method of claim 1, wherein the video content comprises audio content.

4. A system for associating video responses with video content, the system comprising;

a media content server adapted to:

display a webpage including first video content to a content viewer device over a network, the first video content provided by a content provider;

responsive to a preference setting associated with the first video content indicating that video responses may be added, display on the web page a link for providing video responses;

a comment engine, coupled to the media content server, adapted to:

receive via activation of the link a request from the content viewer to provide a real-time video response to the displayed first video content;

the media content server, coupled to the comment engine, further adapted to:

activate a video input device associated with the content viewer device;

associate the received video response with the displayed first video content, wherein the video response is searchable separately from the first video content commented by the video response, and display of the first video content is updated to include an indicia of the received video response and one or more textual comments on the first video content provided by a plurality of other viewers; and responsive to receiving from the content provider approval of the received video response, displaying the indicia of the received video response on the web page.

5. The system of claim 4 wherein the media content server is further adapted to display indicia of the real-time video response in conjunction with providing the video content to the content viewer.

6. A non-transitory computer-readable storage medium having computer executable code for associating video responses with video content, the code adapted to perform steps comprising:

displaying a web page including first video content to a content viewer device over a network, the first video content provided by a content provider;

responsive to a preference setting associated with the first video content indicating that video responses may be added, displaying on the web page a link for providing video responses;

receiving via activation of the link a request from the viewer to provide a video response to the displayed first video content;

activating a video input device associated with the content viewer device;

receiving the video response from the viewer via the video input device;

associating the received video response with the displayed first video content, wherein the video response is searchable separately from the first video content commented by the video response, and display of the first video content is updated to include an indicia of the received video response and one or more textual comments on the first video content provided by a plurality of other viewers; and responsive to receiving from the content provider approval of the received video response, displaying the indicia of the received video response on the web page.

7. The method of claim 1, wherein the video response comprises at least one of a title and a thumbnail image of the video response.

8. The method of claim 7, wherein the video response is searchable based, at least in part, on the title and the thumbnail image of the video response.

9. The method of claim 1, wherein the indicia of the received video response includes a thumbnail image from the received video response.

10. The method of claim 9, wherein the indicia includes a user ID of the viewer.

11. The method of claim 1, wherein the web page includes a link for providing additional video feedback.

12. The method of claim 1, further comprising displaying indicia of additional received video feedback received from a plurality of viewers.

13. The method of claim 1, further comprising displaying textual comments received from a plurality of viewers.

14. The method of claim 1, further comprising receiving from the content provider approval to add the received video response.

* * * * *